US008821713B2

(12) United States Patent
Hassan et al.

(10) Patent No.: US 8,821,713 B2
(45) Date of Patent: Sep. 2, 2014

(54) HIGH SHEAR PROCESS FOR PROCESSING NAPHTHA

(75) Inventors: Abbas Hassan, Sugar Land, TX (US); Aziz Hassan, Sugar Land, TX (US); Krishnan Viswanathan, Houston, TX (US); Gregory G. Borsinger, Chatham, NJ (US)

(73) Assignee: H R D Corporation, Houston, TX (US)

( * ) Notice: Subject to any disclaimer, the term of this patent is extended or adjusted under 35 U.S.C. 154(b) by 930 days.

(21) Appl. No.: 12/969,372

(22) Filed: Dec. 15, 2010

(65) Prior Publication Data

US 2011/0315601 A1     Dec. 29, 2011

Related U.S. Application Data

(60) Provisional application No. 61/287,617, filed on Dec. 17, 2009.

(51) Int. Cl.
| | |
|---|---|
| *C10G 9/14* | (2006.01) |
| *C10G 9/40* | (2006.01) |
| *C10G 31/00* | (2006.01) |
| *B01F 13/10* | (2006.01) |
| *C10G 15/08* | (2006.01) |
| *C10G 9/00* | (2006.01) |
| *B01F 7/00* | (2006.01) |

(52) U.S. Cl.
CPC ............... *C10G 9/40* (2013.01); *B01F 7/00766* (2013.01); *C10G 2300/807* (2013.01); *C10G 31/00* (2013.01); *B01F 13/1016* (2013.01); *C10G 2300/1044* (2013.01); *C10G 15/08* (2013.01); *C10G 9/00* (2013.01); *B01F 13/1013* (2013.01)
USPC .............................. 208/85; 208/106; 208/132

(58) Field of Classification Search
USPC ........................................... 208/85, 106, 132
See application file for complete search history.

(56) References Cited

U.S. PATENT DOCUMENTS

| | | | |
|---|---|---|---|
| 3,429,803 A * | 2/1969 | Hallman ....................... 208/108 |
| 3,887,167 A | 6/1975 | Irwin | |
| 4,619,757 A | 10/1986 | Zimmermann et al. | |
| 5,538,191 A | 7/1996 | Holl | |
| 5,877,350 A | 3/1999 | Langer et al. | |
| 6,190,533 B1 | 2/2001 | Bradow et al. | |
| 6,368,366 B1 | 4/2002 | Langer et al. | |
| 6,368,367 B1 | 4/2002 | Langer et al. | |
| 6,383,237 B1 | 5/2002 | Langer et al. | |
| 6,530,964 B2 | 3/2003 | Langer et al. | |
| 6,742,774 B2 | 6/2004 | Holl | |
| 7,575,728 B2 | 8/2009 | Holl | |
| 8,021,539 B2 | 9/2011 | Hassan et al. | |
| 2003/0043690 A1 | 3/2003 | Holl | |
| 2004/0052158 A1 | 3/2004 | Holl | |
| 2005/0033069 A1 | 2/2005 | Holl et al. | |
| 2006/0054534 A1 | 3/2006 | Chen et al. | |
| 2006/0201854 A1 | 9/2006 | Lott | |
| 2009/0000986 A1* | 1/2009 | Hassan et al. ................. 208/108 |
| 2009/0000989 A1 | 1/2009 | Hassan et al. | |
| 2009/0003126 A1 | 1/2009 | Hassan et al. | |

FOREIGN PATENT DOCUMENTS

| | | |
|---|---|---|
| WO | 02064708 A2 | 8/2002 |
| WO | 2006122275 | 11/2006 |

OTHER PUBLICATIONS

Search Report and Written Opinion dated Jul. 28, 2011 for International Application No. PCT/US2010/060683 (11 pgs.).
International Report on Patentability dated Jun. 28, 2012 for International Application No. PCT/US2010/060683 (6 pgs.).
IKA-Rotor-Stator Generators—2003 Processing Catalog (38 pgs.).
Gogate, et al. "Cavitation: A technology on the horizon," Current Science 91, No. 1, Jul. 2006, pp. 35-46 (12 pgs.).
Office Action dated Jun. 25, 2009 for U.S. Appl. No. 12/142,447 (10 pgs.).
Office Action dated Jan. 7, 2010 for U.S. Appl. No. 12/142,447 (6 pgs.).
Office Action dated May 13, 2010 for U.S. Appl. No. 12/142,447 (5 pgs.).
Office Action dated Feb. 4, 2010 for U.S. Appl. No. 12/492,721 (5 pgs.).
Office Action dated Feb. 18, 2010 for U.S. Appl. No. 12/635,433 (6 pgs.).
Office Action dated Feb. 18, 2010 for U.S. Appl. No. 12/635,454 (6 pgs.).
Office Action dated May 14, 2010 for U.S. Appl. No. 12/137,441 (15 pgs.).
Office Action dated Feb. 19, 2010 for U.S. Appl. No. 12/144,459 (10 pgs.).
Office Action dated Sep. 2, 2009 for U.S. Appl. No. 12/142,433 (11 pgs.).
Office Action dated Jan. 29, 2010 for U.S. Appl. No. 12/142,433 (8 pgs.).
Office Action dated May 24, 2011 for U.S. Appl. No. 12/142,433 (10 pgs.).
Office Action dated Apr. 30, 2010 for U.S. Appl. No. 12/141,191 (12 pgs.).
Office Action dated Oct. 27, 2009 for U.S. Appl. No. 12/142,120 (15 pgs.).
Office Action dated May 5, 2010 for U.S. Appl. No. 12/571,537 (12 pgs.).
Office Action dated Feb. 24, 2011 for U.S. Appl. No. 12/796,358 (13 pgs.).

(Continued)

*Primary Examiner* — Randy Boyer
(74) *Attorney, Agent, or Firm* — Timothy S. Westby; Porter Hedges, LLP.

(57) ABSTRACT

A method and system for processing naphtha, including a high shear mechanical device. In one embodiment, the method comprises forming a dispersion of gas in a naphtha hydrocarbon liquid in a high shear device prior to introduction in a cracking reactor/furnace. In another instance the system for processing naphtha comprises a high shear device for mechanically shearing hydrocarbons.

15 Claims, 3 Drawing Sheets

(56) References Cited

OTHER PUBLICATIONS

Office Action dated Feb. 29, 2012 for U.S. Appl. No. 12/146,733 (8 pgs.).
Office Action dated Jun. 3, 2011 for U.S. Appl. No. 12/568,155 (11 pgs.).
Office Action dated Jun. 2, 2011 for U.S. Appl. No. 12/427,286 (12 pgs.).
Office Action dated Jun. 3, 2011 for U.S. Appl. No. 12/568,280 (16 pgs.).
IKA, "Introduction to IKA's Three Stage Dispax Reactor," Retrieved from <http://www.ikausa.com/pdfs/process/dr%202000-Homogenizing-Dispersing-Suspending-Emulsifying.pdf> on Aug. 22, 2012 (12 pgs.).
IKA-DRS Reactors website http://www.ikausa.com/dr.him, on Sep. 8, 2010 (2 pgs.).
Chattopadhyay et al., "Understanding Mechanical Energy Driven Nonequilibrium Processing: Some Results, Eleventh International Conference on Rapidly Quenched and Metastable Materials." A Material Science and Engineering, vol. 375-377, dated Jul. 15, 2004, pp. 72-77 (9 pgs.).
European Search report dated Jan. 28, 2014 for corresponding European Application No. 10842586.9-1361 (5 pgs.).

* cited by examiner

HIGH SHEAR PROCESS FOR PROCESSING NAPHTHA

CROSS-REFERENCE TO RELATED APPLICATIONS

This application claims benefit under 35 USC §119 of U.S. provisional application No. 61/287,617 filed Dec. 17, 2009, entitled "High Shear Process For Processing Naphtha" which is hereby incorporated herein by reference in its entirety for all purposes.

STATEMENT REGARDING FEDERALLY SPONSORED RESEARCH OR DEVELOPMENT

Not applicable.

BACKGROUND

1. Field of the Invention

This invention relates to producing lower molecular weight hydrocarbons; specifically it relates to processing naphtha utilizing a high shear device.

2. Background of the Invention

Conventionally, the process of cracking hydrocarbons is dependent on temperature and optionally, the exposure of reactants to catalysts. The process cleaves higher molecular-weight, longer chain, heavy hydrocarbons to form low molecular-weight, short-chain, light hydrocarbons. These light hydrocarbons may be further refined for liquid fuels and other applications.

Liquid naphtha is obtained in petroleum refineries as one of the intermediate products from the distillation of crude oil and is used as a feedstock for olefin (ethylene and propylene) production. Naphtha is often cracked by a process commonly referred to as steam cracking where steam is injected into the liquid naphtha and briefly (milliseconds) heated to high temperatures (800° C.-900° C.), whereby it is cracked into lighter components including olefins. Steam cracking of naphtha produces a mixed stream of light hydrocarbons that includes very desirable ethylene and propylene components.

However, steam cracking of naphtha is an energy intensive reaction. For example, mixing high temperature steam with the naphtha, maintaining the temperature and reactor residence time represent energy costs associated with steam cracking. Additionally, in order to control the light gas product composition, cracking efficiency, and minimize coking, the severity or temperature of the reaction requires control of a narrow range of operational parameters. Any parameter of the reaction occurring outside this optimal range results in potential loss of the light gas products, revenue, and profit.

There is a need in the industry to reduce energy consumption and increase the yield of higher value components such as ethylene and propylene from steam cracking. There is also a need to reduce coking of steam cracking furnaces that results in costly downtime, increased maintenance, and lost efficiencies.

BRIEF SUMMARY

A system for processing naphtha to form light hydrocarbon liquids and gases is described. The system comprising at least one high shear device to mechanically shear the heavier hydrocarbons in naphtha and intimately disperse steam uniformly within the naphtha. In certain instances, the system comprises a reactant gas stream for forming a reactant gas dispersion in naphtha by high shear processing. The system further comprising a cracking reactor/furnace to form mixed hydrocarbon products.

A method for processing naphtha to form light hydrocarbon liquids and gases, comprising introducing a naphtha feed to at least one high shear device. Further, contacting the naphtha feed with a reactant gas stream for forming a dispersion of gas in the naphtha. Introducing the dispersion to a cracking reactor to form hydrocarbon products, and separating the light hydrocarbon products from heavier hydrocarbon products. Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

These and other embodiments, features and advantages will be apparent in the following detailed description and drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Overview:

The present disclosure provides a system and method for the processing of naphtha and naphtha feedstocks for cracking. The system and method employ a high shear mechanical device to provide mechanical shearing of the hydrocarbons in naphtha in a controlled environment. In certain instances, high temperature steam is dispersed into the naphtha by passing through a high shear device. The high shear dispersion of the steam, or gaseous water vapor, into the naphtha stream forms a dispersion of steam gas bubbles in the liquid naphtha. The dispersion is directed to a furnace reactor where cracking of the hydrocarbons occurs. The steam and naphtha are processed in the reactor to form a light hydrocarbon stream, and then the reaction is quenched to stop further reactions.

Further, the naphtha is contacted with a multi-gas stream comprising at least one of a high temperature steam, methane, natural gas, or combinations thereof. The mixture of naphtha and the multi-gas stream is subjected to a high shear device. The high shear dispersion of this multi-gas stream into naphtha may be directed to a reactor/furnace. The product of the multi-gas dispersion comprises a light hydrocarbon stream. Under certain conditions, the light hydrocarbon stream comprises olefins, for instance ethylene or propylene, and acetylenes. The conditions of the high shear device and the reactor may be controlled to produce a predetermined product in the light hydrocarbon stream. In certain instances, a portion of the reacted naphtha products is recycled or introduced to further high shear conditions to produce a selected light hydrocarbon stream.

In conventional steam cracking reactors, the contact and reaction time for the naphtha is often controlled by the gas flow rate through a reactor vessel, or furnace which provides contact between the reactants and/or phases at reaction temperatures and pressures. Without being limited by theory a reactor assembly that comprises a high shear device allows for intimate mixing of the steam with naphtha thus providing for more precise and uniform temperature control in the cracking furnace resulting in reduced coking and more control of end product composition. The high shear device of the present invention is also known to create free radicals under high shear conditions that help propagate the desired cleavage of short chain length carbon compounds from naphtha. This also allows for higher yields of desirable olefin products from the cracking furnace. A typical analysis for existing naphtha steam crackers have cracked gas compositions as found in Table 1.

TABLE 1

Exemplary Naphtha Cracker Stream Composition

| Cracked gas composition | wt % |
|---|---|
| Ethylene | 24 |
| Propylene | 14 |
| Methane | 11 |
| Benzene | 8 |
| Toluene | 8 |
| Other | ~35 |

Source: Energy efficient design of the cold train of a steam cracker; Presentation by K. Van Geem+, J. Grootjans+, G. B. Marin235th ACS National Meeting, Apr. 10, 2008, New Orleans, LA Without being limited by theory, the high shear device may also result in the formation of a narrower molecular-weight distribution of hydrocarbons continuously from a naphtha feedstock for downstream applications. A narrower hydrocarbon distribution improves efficiency of downstream distillation and processing. The distribution of hydrocarbon molecular weights may be considered the distribution about a mean or average; in some cases the molecular weight distribution is a Gaussian distribution about the mean molecular weight or chain length. In further instances, the distribution of hydrocarbon molecular weights may be controlled.

High Shear Device:

High shear devices (HSD) such as high shear mixers and high shear mills are generally divided into classes based upon their ability to mix fluids. Mixing is the process of reducing the size of inhomogeneous species or particles within the fluid. One metric for the degree or thoroughness of mixing is the energy density per unit volume that the mixing device generates to disrupt the fluid. The classes are distinguished based on delivered energy density. There are three classes of industrial mixers having sufficient energy density to create dispersions with particle or bubble sizes in the range of about 0.001 µm to about 50 µm consistently.

Homogenization valve systems are typically classified as high-energy devices. Fluid to be processed is pumped or injected under very high pressure through a narrow-gap valve into a lower pressure environment. The pressure gradients across the valve and the resulting turbulence and cavitations act to break-up and mildly shear any particles, long chain molecules, bubbles, micelles, or different phases in the fluid. These valve systems are most commonly used in milk homogenization and may yield average particle size range from about 0.01 µm to about 1 µm. At the other end of the spectrum are fluid mixer systems classified as low energy devices. These systems usually have paddles or fluid rotors that turn at high speed in a reservoir of fluid to be processed, which in many of the more common applications is a food product. These systems are usually used when average particle, globule, or bubble, sizes of greater than 20 microns are acceptable in the processed fluid.

Between low energy, high shear mixers and homogenization valve systems, in terms of the mixing energy density delivered to the fluid, are colloid mills, which are classified as intermediate energy devices. The typical colloid mill configuration includes a conical or disk rotor that is separated from a complementary, liquid-cooled stator by a closely controlled rotor-stator gap, which may be in the range from about 0.25 µm to 10.0 mm. Rotors may be driven, for example, by an electric motor via direct drive, or alternatively, a belt mechanism. Many colloid mills, with proper adjustments, may achieve average particle, or bubble, sizes of about 0.001 µm to about 25 µm in the processed fluid. These capabilities render colloid mills appropriate for a variety of applications including, but not limited to: colloidal and oil/water-based dispersion processing. In certain instances, the colloid mills can be applied to processes such as preparation of cosmetics, mayonnaise, silicone/silver amalgam, roofing-tar mixtures, and certain paint products.

Figure 1:
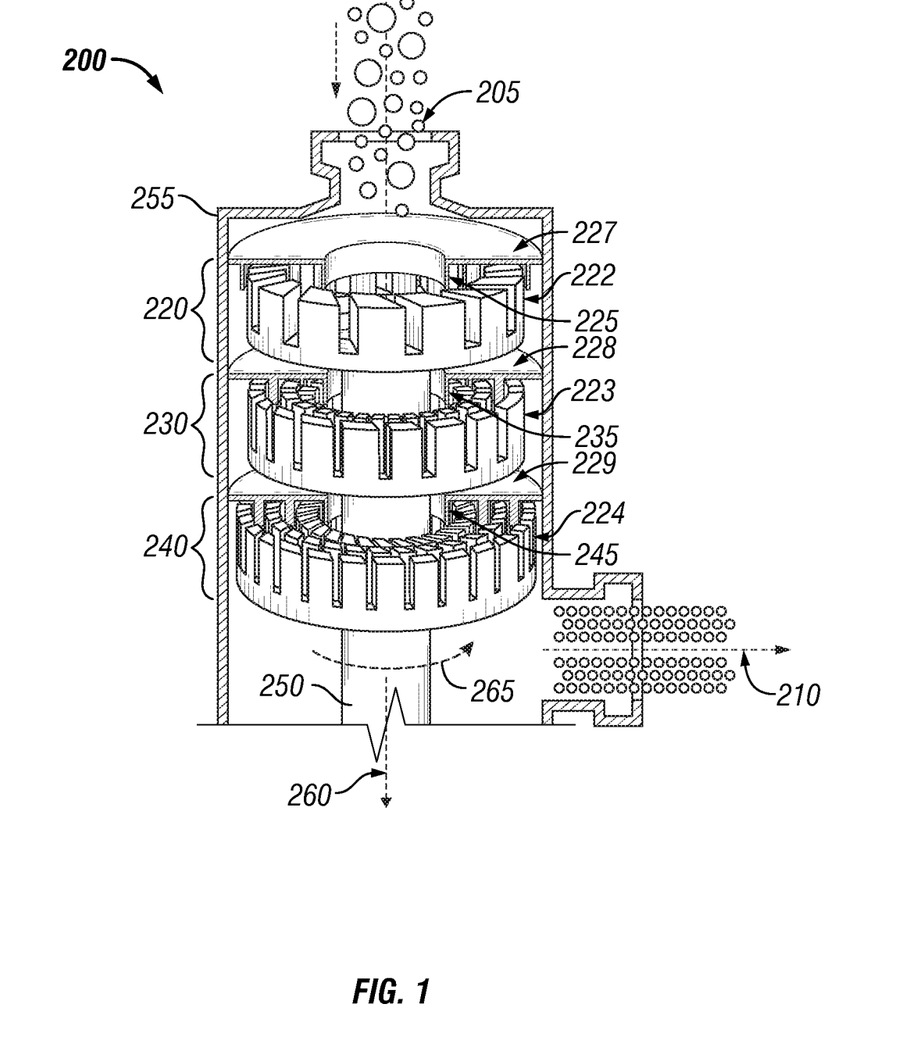
FIG. 1 is a cross-sectional diagram of a high shear device for processing naphtha.

Referring now to FIG. 1, there is presented a schematic diagram of a high shear device 200. High shear device 200 comprises at least one rotor-stator combination. The rotor-stator combinations may also be known as generators 220, 230, 240 or stages without limitation. The high shear device 200 comprises at least two generators, and most preferably, the high shear device comprises at least three generators. The first generator 220 comprises rotor 222 and stator 227. The second generator 230 comprises rotor 223, and stator 228; the third generator comprises rotor 224 and stator 229. For each generator 220, 230, 240 the rotor is rotatably driven by input 250. The generators 220, 230, 240 are configured to rotate about axis 260, in rotational direction 265. Stator 227 is fixably coupled to the high shear device wall 255.

The generators include gaps between the rotor and the stator. The first generator 220 comprises a first gap 225; the second generator 230 comprises a second gap 235; and the third generator 240 comprises a third gap 245. The gaps 225, 235, 245 are between about 0.25 µm ($10^{-5}$ in) and 10.0 mm (0.4 in) wide. Alternatively, the process comprises utilization of a high shear device 200 wherein the gaps 225, 235, 245 are between about 0.5 mm (0.02 in) and about 2.5 mm (0.1 in). In certain instances, the gap is maintained at about 1.5 mm (0.06 in). Alternatively, the gaps 225, 235, 245 are different between generators 220, 230, 240. In certain instances, the gap 225 for the first generator 220 is greater than about the gap 235 for the second generator 230, which is greater than about the gap 245 for the third generator 240.

Additionally, the width of the gaps 225, 235, 245 may comprise a coarse, medium, fine, and super-fine characterization correlating to a decrease in the size of the gaps 225, 235, 245. Rotors 222, 223, and 224 and stators 227, 228, and 229 may be toothed designs. Each generator may comprise two or more sets of rotor-stator teeth, as known in the art. Rotors 222, 223, and 224 may comprise a number of rotor teeth circumferentially spaced about the circumference of each rotor. Stators 227, 228, and 229 may comprise a number of stator teeth circumferentially spaced about the circumference of each stator.

In certain embodiments, the rotor teeth have uniform spacing about the circumference of each rotor 222, 223, and 224. For example, the distance between each tooth may be between about 0.5 mm (0.02 in) and about 2.5 mm (0.1 in), alternatively, between about 0.5 mm (0.02 in) and about 1.5 mm (0.06 in). In certain instances, the gap is maintained at about 1.5 mm (0.06 in). In instances, the distance between each tooth on each rotor 222, 223, and 224 may be different. Without limitation by theory, altering the gap in the teeth of the rotor may 222, 223, and 224 pulse the shear rate with each revolution of the rotor.

In certain embodiments, the stator teeth have uniform spacing about the circumference of each stator 227, 228, and 229. For example, the distance between each tooth may be between about 0.5 mm (0.02 in) and about 2.5 mm (0.1 in), alternatively, between about 0.5 mm (0.02 in) and about 1.5 mm (0.06 in). In certain instances, the gap is maintained at about 1.5 mm (0.06 in). In instances, the distance between each tooth on each stator 227, 228, and 229 may be different. Without limitation by theory, altering the gap in the teeth may configure the stator 227, 228, and 229 to pulse the shear rate with each revolution of the rotor.

In embodiments, the inner diameter of the rotor is about 11.8 cm. In embodiments, the outer diameter of the stator is about 15.4 cm. In further embodiments, the rotor and stator may have an outer diameter of about 60 mm for the rotor, and about 64 mm for the stator. Alternatively, the rotor and stator may be configured with alternate diameters in order to increase the tip speed and shear pressures, for instance in a commercial scale device. Without limitation by theory, a commercial scale rotor and stator may have considerably larger diameters, measure in meters, for instances. In certain embodiments, each of three stages is operated with a super-fine generator, comprising a gap of between about 0.025 mm and about 3 mm. When a feed stream 205, comprising a dispersible phase and a continuous phase, is sent through high shear device 200, a gap width is predetermined to achieve a desired dispersion.

Feed stream 205 comprises a continuous phase and a dispersible phase for forming dispersion after high shear mixing. In certain instances, the continuous phase of feed stream 205 comprises a liquid reactant stream, for instance naphtha. Further, feed stream 205 continuous phase may comprise any liquid, waxy, or other hydrocarbon residues in the liquid phase. The continuous phase may further comprise a solvent, a carrier liquid, or a reactant carrier, without limitation. The dispersible phase of feed stream 205 comprises a gas or vapor, such as steam, for dispersion into the continuous phase. Alternatively, the dispersible phase comprises a gas dissolved in a carrier liquid, for instance methanol in water, which will not readily mix and/or dissolve in the continuous phase. In instances where the feed stream 205 is to be reacted with gases, the dispersible phase comprises: gas bubbles, gas particles, vapor droplets, globules, micelles, or combinations thereof. The feed stream 205 may include a particulate solid component, for instance a catalyst, in the dispersible phase. As used herein, the dispersible phase including gases, liquids and solids, comprises particles. In certain instances, feed stream 205 comprises a heterogeneous mixture of the dispersible phase in the continuous phase. The heterogeneous mixture may be highly viscous liquid, such as slurries or pastes. As used herein, heterogeneous mixture encompasses a continuous phase comprising a naphtha stream with any reactant in the dispersible phase. Without being limited by any particular theory, the feed stream 205 comprising a heterogeneous mixture has a continuous phase and a dispersible phase prior to or simultaneous with introduction to high shear device 200.

Feed stream 205 introduced to high shear device 200 is pumped through the generators 220, 230, 240, such that product dispersion 210 is formed. Product dispersion 210 comprises particles of the dispersible phase homogeneously distributed through the continuous phase. In each generator, the rotors 222, 223, 224 rotate at high speed relative to the fixed stators 227, 228, 229. The rotation of the rotors forces fluid, such as the feed stream 205, between the outer surface of the rotor 222 and the inner surface of the stator 227 creating localized high shear conditions. The gaps 225, 235, 245 generate high shear forces that process the feed stream 205. The high shear forces between the rotor and stator form a more homogeneous dispersion of the dispersible phase particles in the continuous phase, to form the product dispersion 210. Additionally, the high shear forces reduce the mean particle size. Each generator 220, 230, 240 of the high shear device 200 has interchangeable rotor-stator combinations for producing a narrow distribution of the desired particle size. Without limitation by theory, the rotor-stator combinations are selected to form a desired dispersion and particle size.

The product dispersion 210 has an average particle size less than about 1.5 µm; in certain instances the particles are sub-micron in diameter. In certain instances, the average particle size is in the range from about 1.0 µm to about 0.1 µm. Alternatively, the average particle size is less than about 400 nm (0.4 µm) and most preferably less than about 100 nm (0.1 µm). Preferably, the globules are at least micron sized. In instances, the high shear device 200 is configured to produce micron-size steam dispersions in naphtha. In embodiments, the generators 220, 230, 240 are configured to produce steam dispersions with average particle or globule size ranging from about 1 micron to about 500 microns in diameter. In certain embodiments, the globule size is about 50 microns in diameter. The globule sizes are be controllable by the amount of shear applied to the fluid and the configuration of the generators 220, 230, 240 as described previously.

Tip speed is the velocity (m/sec) associated with the end of one or more revolving elements that is transmitting energy to the reactants. Tip speed, for a rotating element, is the circumferential distance traveled by the tip of the rotor per unit of time, and is generally defined by the equation $V$ (m/sec) $=\pi \cdot D \cdot n$, where V is the tip speed, D is the diameter of the rotor, in meters, and n is the rotational speed of the rotor, in revolutions per second. Tip speed is thus a function of the rotor diameter and the rotation rate. In certain embodiments, altering the diameter or the rotational rate may increase the shear rate in high shear device 200.

For colloid mills, typical tip speeds are in excess of 23 msec (4500 ft/min) and may exceed 40 msec (7900 ft/min). For the purpose of the present disclosure the term 'high shear' refers to mechanical rotor-stator devices, such as mills or mixers, that are capable of tip speeds in excess of 1 msec (200 ft/min) and require an external mechanically driven power device to drive energy into the stream of products to be reacted. A high shear device combines high tip speeds with a very small shear gap to produce significant friction on the material being processed. Accordingly, a local pressure in the range of about 1000 MPa (about 145,000 psi) to about 1050 MPa (152,300 psi) and elevated temperatures at the tip are produced during operation. In certain embodiments, the local pressure is at least about 1034 MPa (about 150,000 psi). The local pressure further depends on the tip speed, fluid viscosity, and the rotor-stator gap during operation.

The shear rate is the tip speed divided by the shear gap width (minimal clearance between the rotor and stator). An approximation of energy input into the fluid (kW/l/min) may be made by measuring the motor energy (kW) and fluid output (l/min). In embodiments, the energy expenditure of a high shear device is greater than 1000 W/m$^3$. In embodiments, the energy expenditure is in the range of from about 3000 W/m$^3$ to about 7500 W/m$^3$.

The high shear device 200 combines high tip speeds with a very small shear gap to produce significant shear on the material. The amount of shear is typically dependent on the viscosity of the fluid and the shear gap. The shear rate generated in a high shear device 200 may be greater than 20,000 s$^{-1}$. In embodiments, the shear rate generated is in the range of from 20,000 s$^{-1}$ to 100,000 s$^{-1}$. The shear rate generated in HSD 40 may be in the greater than 100,000 s$^{-1}$. In some embodiments, the shear rate is at least 500,000 s$^{-1}$. In some embodiments, the shear rate is at least 1,000,000 s$^{-1}$. In some embodiments, the shear rate is at least 1,600,000 s$^{-1}$. In embodiments, the shear rate generated by HSD 40 is in the range of from 20,000 s$^{-1}$ to 100,000 s$^{-1}$. For example, in one application the rotor tip speed is about 40 m/s (7900 ft/min) and the shear gap width is 0.0254 mm (0.001 inch), producing a shear rate of 1,600,000 s$^{-1}$. In another application, the rotor tip speed is about 22.9 m/s (4500 ft/min) and the shear gap width is 0.0254 mm (0.001 inch), producing a shear rate of about 901,600 s$^{-1}$.

The rotor is set to rotate at a speed commensurate with the diameter of the rotor and the desired tip speed as described hereinabove. Without being limited by theory, transport resistance is reduced by incorporation of high shear device 200 such that the dispersion of steam in naphtha is increased and coking of the furnace is reduced. Alternatively, the high shear device 200 comprises a high shear colloid mill that serves to accelerate reactions downstream and in the reactor due to the formation of free radicals created by the high pressures and temperatures present instantaneously at the tip of the rotating high shear device. Accelerating reactions downstream from the high shear device 200 may utilize a single stage or dispersing chamber, in certain instances. Further, in alternate configurations accelerating reactions downstream may include a plurality of inline devices, for instance comprising at least 2 stages.

Selection of the high shear device 200 is dependent on throughput requirements and desired particle size in the outlet dispersion 210. In certain instances, high shear device 200 comprises a DISPAX REACTOR® of IKA® Works, Inc. Wilmington, N.C. and APV North America, Inc. Wilmington, Mass. Model DR 2000/4, for example, comprises a belt drive, 4M generator, PTFE sealing ring, inlet flange 1" sanitary clamp, outlet flange ¾" sanitary clamp, 2HP power, output speed of 7900 rpm, flow capacity approximately 300 l/h to approximately 700 l/h (depending on generator), a tip speed of from 9.4 m/s to above about 41 m/s (about 1850 ft/min to above about 8070 ft/min). Several alternative models are available having various inlet/outlet connections, horsepower, tip speeds, output rpm, and flow rate. In further instances, the high shear device 200 comprises any device configured to produce the high shear rate and throughput for forming a product dispersion.

Without wishing to be limited to any particular theory, it is believed that the degree of high shear mixing in a high shear device is sufficient to increase rates of mass transfer. Further, a high shear device may produce localized non-ideal conditions that enable formation of free radicals and reactions to occur that would not otherwise be expected to occur based on Gibbs free energy predictions. Additionally, such reactions would not be expected at low shear mixing parameters. Localized non-ideal conditions are believed to occur within the high shear device resulting in increased temperatures and pressures with the most significant increase believed to be in localized pressures. The increase in pressures and temperatures within the high shear device are instantaneous and localized. In certain instances, the temperature and pressure increases revert to bulk or average system conditions once exiting the high shear device. In some cases, the high shear-mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid microcirculation (acoustic streaming). An overview of the application of cavitation phenomenon in chemical/physical processing applications is provided by Gogate et al., "Cavitation: A technology on the horizon," Current Science 91 (No. 1): 35-46 (2006). The high shear-mixing device of certain embodiments of the present system and methods is operated under what are believed to be cavitation conditions that might be useful in reactions for the processing of naphtha and the production of lower molecular weight compounds.

Alternatively, the application of high shear to a fluid may cause temperature and/or pressure sufficient to mechanically break or cleave molecular and atomic bonds. Without being limited by theory, the mechanical cleavage of these bonds may form free radicals. The free radical formation may result in localized ionic or free radical attacks on other molecular and atomic bonds. The incidence of these ionic and/or free radical attacks accelerates the rates of reactions in certain hydrocarbon reforming and upgrading reactions. The incidence of ionic and free radicals exposed to hydrocarbons, hydrogen, steam, and optionally catalysts in the feed stream are believed to push reaction kinetics toward short chain hydrocarbons, such as but not limited to ethylene, propylene (propene), and butylene.

Figure 2:
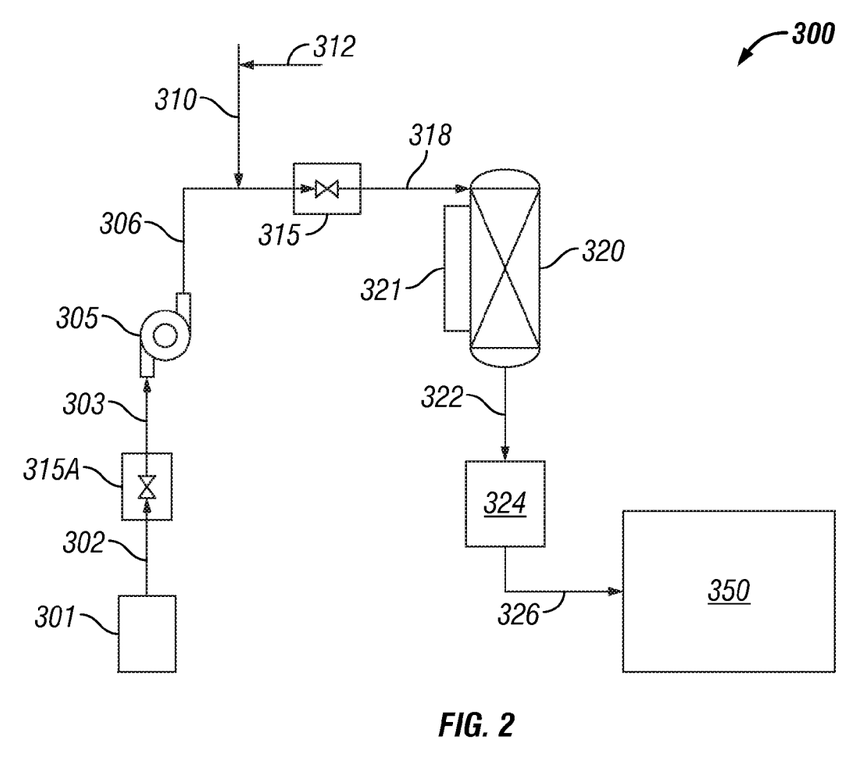
FIG. 2 illustrates a schematic diagram of a high shear naphtha processing system.

Description of High Shear Process and System for Processing Naphtha:

Referring to FIG. 2, the high shear system 300 (HSS 300) for processing of naphtha comprises a naphtha source 301, a reactor 320, including reactant feeds 310, and a plurality of processing, separating, and refining steps to produce a desired light hydrocarbon stream. The reactor 320 comprises any reactor suitable for the steam cracking of naphtha, for instance a furnace reactor. Alternatively, the reactor 320 is a furnace. The high shear device 315 provides for improved dispersion of reactants in a dispersible phase into the naphtha as the continuous phase. Further, as described hereinabove, the high shear processing system is configured to alter a hydrocarbon distribution in a product stream, such that a narrower distribution of hydrocarbon molecular weights or chain lengths is produced. The distribution of hydrocarbon molecular weights may be considered the distribution about a mean or average; in some cases the molecular weight distribution is a Gaussian distribution about the mean molecular weight.

Naphtha stream 302 from naphtha source 301 comprises any stream of hydrocarbon liquids, waxes, residues, mixed hydrocarbons, tars, and naphtha as understood by one skilled in the art. Naphtha stream 302 is provided motive force by pump 305. In certain instances, the naphtha stream 302 is pressurized by pump 305. Optionally, described hereinbelow, naphtha stream 302 is subjected to a first high shear device 315A to form naphtha stream 303. First high shear device 315A is configured to be positioned prior to or after pump 305. Pump 305 is configured for either continuous or semi-continuous operation, and may be any suitable pumping device that is capable of providing greater than about 202.65 kPa (2 atm) pressure, preferably greater than about 303.975 kPa (3 atm) pressure, to allow controlled flow through HSD 315 and through out system 300. Preferably, all contact parts of the pump 305 comprise stainless steel, for example, 316 stainless steel. In addition to pump 305, one or more additional pumps (not shown) may be included in the HSS 300 illustrated in FIG. 2. For example, a booster pump, which may be similar to pump 305, may be included between HSD 315 and reactor 320 for boosting the pressure, accelerating reactant flow into or through reactor 320 to control reaction time. A pump 305 may be implemented for spent, unused, or incomplete reactant recycle throughout HSS 300. As another example, a supplemental feed pump, which may be similar to pump 305, may be included for introducing additional reactants or catalyst into the components of HSS 300. A Roper Type 1 gear pump, Roper Pump Company (Commerce Georgia) Dayton Pressure Booster Pump Model 2P372E, Dayton Electric Co (Niles, Ill.) is an exemplary pump for HSS 300. Pump 305 produces HSD feed stream 306.

HSD feed stream 306 comprises the pressurized naphtha stream 302. HSD feed stream 306 is routed directly or indirectly to HSD 315. HSD feed stream 306 may be any liquid hydrocarbon stream. Further, HSD feed stream 306 may be pretreated by hydrotreating and other means known to those experienced in the art in order to remove undesirable components such as sulfur and heavy organic compounds by means known to those in the art. For example U.S. Pat. No. 4,619,757 and U.S. Pat. No. 6,190,533. HSD feed stream 306 is directed to the high shear device (HSD) 315. In certain instances, HSD feed stream 306 comprises heat exchangers. HSD feed stream 306 may be heated or cooled any method known to one skilled in the art. The use of external heating and/or cooling heat transfer devices for changing the temperature of HSD feed stream 306 is also contemplated. Some non-limiting examples of such heat exchangers include shell, tube, plate, and coil heat exchangers, as are known in the art.

HSD feed stream 306 may also be in fluid communication with a gas stream 310. Gas stream 310 comprises a dispersible phase stream. In instances, HSS 300 comprises a steam cracker for naphtha such that the gas stream 310 comprises steam or water vapor. Alternatively, the dispersible phase may comprise mixtures of steam with hydrogen, methane, natural gas, and other gaseous components, such as water vapor, comprising gas stream 310. Gas stream 310 is fluidly connected to a supplemental gas stream 312, and in instances, gas stream 310 comprises the components of supplemental gas stream 312. Injecting gas stream 310 forms a heterogeneous mixture of the dispersible phase, gas stream 310, and the continuous phase, naphtha stream 302 in HSD feed stream 306. HSD feed stream 306 is introduced to HSD 315.

Supplemental gas stream 312 adds additional gas reactants and/or enhancers to gas stream 310. Supplemental gas stream 312 may comprise a plurality of gaseous reactants, for instance, steam, hydrogen, and/or methane. It can be envisioned that supplemental gas stream 312 provides particulates to gas stream 310, for instance catalyst fines. Alternatively, supplemental gas stream 312 comprises a recycle stream inlet for off-gases, which are conventionally flared. Gas stream 310, comprising supplemental gas stream 312, is injected into HSD stream 306. Alternatively, gas stream 310 may be injected into HSD 315 directly.

High shear device (HSD) 315, as any described hereinabove. In embodiments, HSD 315 comprises a plurality of high shear generators to form HSD dispersion 318. HSD 315 comprises at least a high shear, three stage dispersing device configured with three rotors in combination with stators, aligned in series. For example, disperser IKA® model DR 2000/4, may be used as HSD 315, to create the dispersion of dispersible gas in the naphtha. The rotor-stator sets may be configured as illustrated for example in FIG. 1. In instances, HSD feed stream 306, gas stream 310, and supplemental gas stream 312 pass through the stages of HSD 315. The HSD feed stream 306, gas stream 310, and supplemental gas stream 312 are subjected to shear therein to form the HSD dispersion 318.

The rotors of HSD 315 may be set to rotate at a speed commensurate with the diameter of the rotor and the desired tip speed. As described above, the high shear device (e.g., colloid mill or toothed rotor) has either a fixed clearance between the stator and rotor or has adjustable clearance. The mixing and shear in HSD 315 is increased at a rotor-stator by decreasing the rotor-stator gaps, or increasing the rotational rate of the rotor, and vice-versa. HSD 315 delivers at least 300 L/h at a tip speed of at least 4500 ft/min, and which may exceed 7900 ft/min (40 m/s). Although measurement of instantaneous temperature and pressure at the tip of a rotating shear unit or revolving element in HSD 315 is difficult, it is estimated that the localized temperature seen by the intimately mixed reactants is in excess of 500° C. and at pressures in excess of 500 kg/cm$^2$ under cavitation conditions. The high shear mixing results in dispersion of micron or submicron-sized gas bubbles in a continuous liquid phase comprising naphtha, as HSD dispersion 318. Further, the HSD 315 may comprise any components and operating conditions configurable and operable to achieve a desired shear between the rotor-stators.

In HSD 315, the rotors and stators of the stages may have circumferentially spaced first stage rotor teeth and stator teeth, respectively. In certain configurations, the rotor-stator gap decreases stepwise from stage to stage. Alternatively, the rotor-stator gap is configured to be constant from stage to stage. Further, HSD 315 may comprise a heat exchanger. In non-limiting examples, a heat exchanger for HSD 315 comprises a conduit for directing a thermal fluid in contact with a thermally conductive portion of the device. More specifically, HSD 315 comprises a PTFE seal that may be cooled using any suitable technique that is known in the art. For example, gas stream 310 and/or supplemental gas stream 312 used to cool the seal and in so doing be preheated as desired prior to entering HSD feed stream 306.

HSD 315 is configured to flow the HSD feed stream 306 through the rotor-stator stages to form HSD dispersion 318. In instances, HSD feed stream 306 enters a first stage rotor-stator combination and is subjected to the mixing and shear of the first stage. The coarse dispersion exiting the first stage enters the second rotor-stator stage, and is subjected to increased mixing and shear. The further reduced, or intermediate, bubble-size dispersion emerging from the second stage enters the third stage rotor-stator combination. The third stage rotor-stator is configured to produce the comparatively highest mixing and shear conditions. Configured thusly, HSD 315 sequentially increases the mixing and shear conditions at each stage. Alternatively, the shear rate is substantially constant along the direction of the flow, with the shear rate in each stage being substantially the same. In another configuration, the shear rate in the first rotor-stator stage is greater than the shear rate in subsequent stage(s).

The HSD feed stream 306 is subjected to the high shear conditions in the HSD 315. The gas stream 310 and naphtha stream 302 of HSD stream 306 are mixed within HSD 315, which serves to create a fine dispersion of the gas in the naphtha. HSD 315 serves to intimately mix the gas and naphtha under high shear conditions. In HSD 315, the gas and naphtha are highly dispersed such that nanobubbles, submicron-sized bubbles, and/or microbubbles of gas are formed for dissolution into solution and enhancement of reactant mixing. The resultant dispersion has an average bubble size less than about 1.5 μm. Accordingly, the dispersion exiting HSD 315 comprises micron and/or submicron-sized gas bubbles. In some embodiments, the resultant dispersion has an average bubble size less than 1 μm. In some embodiments, the mean bubble size is in the range of about 0.4 μm to about 1.5 μm. In some embodiments, the mean bubble size is less than about 400 nm, and may be about 100 nm in some cases. Bubble size is dependent on local pressures and temperatures and may be estimated by ideal gas laws. In embodiments, the dispersion is able to remain dispersed at atmospheric pressure for at least about 15 minutes.

HDS dispersion 318 feeds reactor 320 for producing a mixed hydrocarbon product stream 322, hereinafter MHCP 322. Reactor 320 is any reactor suitable for high temperature, low pressure naphtha cracking. Alternatively, reactor 320 comprises a furnace reactor, coupled to a furnace or heater 321. Further, reactor 320 may comprise a fluidized bed reactor, slurry reactor, fixed bed reactor, trickle bed reactor, bubble column, or the like in thermal communication with the reactor 320. In instances wherein a catalyst is implemented in the reactor 320 to increase the rate of reaction, drive the reaction to a selected product, or to alter the conditions of the reaction, the reactor 320 may include additional components without limitation. Further, the reactor 320 may include one or more of the following components: convection heating zone, radiant high temperature heating zone, heat exchangers, agitators, mixers, reaction condition measurement instrumentation, reaction regulators, pressure measurement instrumentation, temperature measurement instrumentation, one or more injection points, and level regulator (not shown), as are known in the art of reaction vessel design. For example, a stirring system may include a motor driven mixer. A heating and/or cooling apparatus may comprise, for example, a heat exchanger.

Reactor 320 operates such that naphtha reaches temperatures ranging from about 200° C. to about 1100° C. depending on location within the reactor, location with the furnace and low pressures ranging from about 101.3 kPa to about 202.6 KPa (1 atm to 2 atm) of absolute pressure. In general for paraffinic feedstocks, temperatures above about 400° C. result in a shift from cracking at the center of the molecule to the end of the molecule leading to larger quantities olefin products. Short residence times also results in less coking of the reactor and more olefin production. Cracked products typically exit the reactor furnace at a temperature between about 800° C. and about 900° C. Without limitation by theory, the formation of olefins is favored by lower pressures. In instances, steam is added to the naphtha to decrease the partial pressure of the hydrocarbons and to minimize coke formation. In some configurations, the pressure in reactor 320 is less than about 202.25 KPa (2 atm), alternatively, less than about 101.3 kPa (1 atm). In certain instances, it may be preferable to maintain the minimum gas pressure necessary to transport the HSD dispersion 318 through the reactor 320 for a given residence time. Without limitation by theory, the gas pressure is maintained between about 10 psig and about 200 psig, and preferably between about 30 psig and about 100 psig. The residence time in the reactor 320 is kept as low as possible, preferably less than about 100 milliseconds. In the cracking process, the splitting of hydrocarbons in the absence of any chain terminating element or molecule, such as hydrogen without limitation, results in the formation of double bonds that produce desirable light hydrocarbon products such as ethylene and propylene.

Figure 3A:
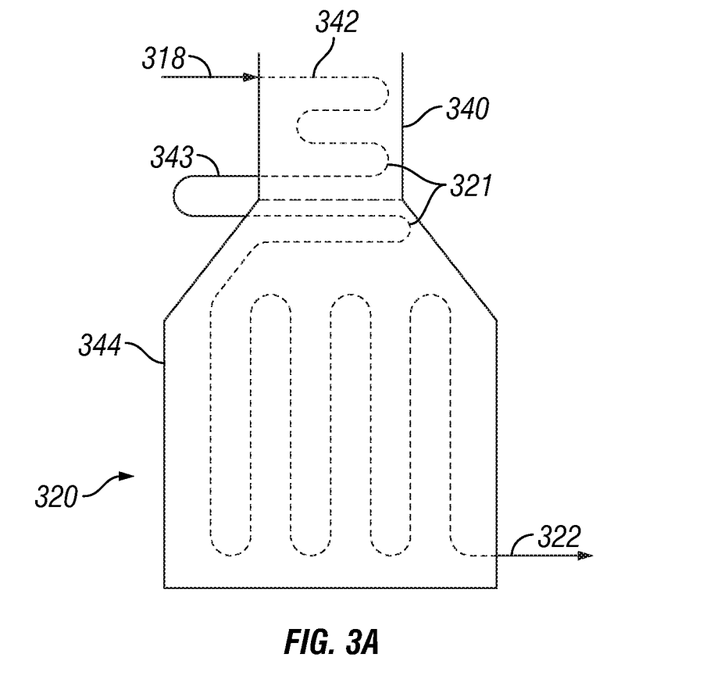
FIG. 3A illustrates a schematic diagram of a steam cracking furnace with radiant and convection zones.

In certain instances, the reactor 320 comprises a furnace tube 321 for moving the HSD dispersion 318 through multiple zones, portions, or sections of the reactor 320. Referring now to FIG. 3A, in certain instances, HSD dispersion 318 enters reactor 320 at a convection section 340. Convection section 340 is configured to heat HSD dispersion to a temperature of between about 200° C. and about 600° C., and in certain instances to between about 200° C. and about 350° C. As the HSD dispersion 318 is heated, it forms heated dispersion 342. In instances, heated dispersion 342 is routed to a radiant section 344 of the reactor 320 either directly or indirectly. In certain configurations, heated dispersion 342 is routed outside of reactor for thermal exchange 343 to produce steam or supplemental steam. Thermal exchange 343 may comprise any apparatus understood by a skilled artisan as suitable for transferring thermal energy from one a fluid to another. In certain instances, thermal exchange is a heat exchanger, such as a counter flow heat exchanger or a cross-flow heat exchanger.

Alternatively, heated dispersion 342 is directly routed to a radiant section 344 of the reactor 320. Radiant section 344 of reactor 320 increases the temperature of the heated dispersion to a temperature between about 600° C. to about 1100° C. Without limitation by theory, the radiant section 344 comprises the cracking reactions in reactor 320 to form MHCP stream 322. In instances, the residence time, temperature and pressure in the reactor 320 are dependent on the HSD dispersion 318, the components of the naphtha stream 302, and the desired composition of the MHCP stream 322. In further instances, the residence time, temperature, and pressure are dependent on the composition of the gas stream 310.

Figure 3B:
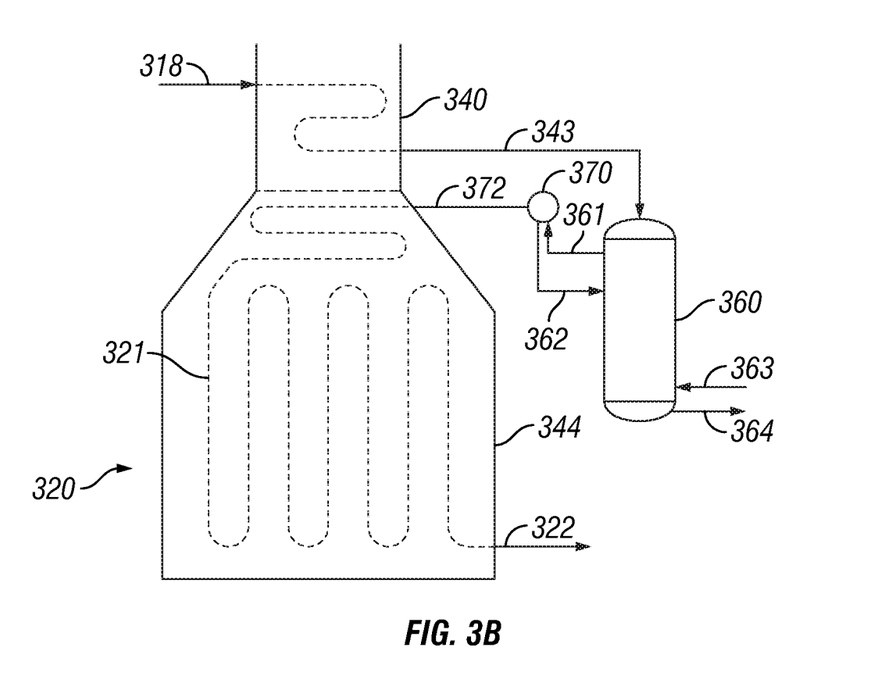
FIG. 3B illustrates a schematic diagram of a steam cracking furnace with a flash drum.

In alternate configurations, heated dispersion 342 is directed to any component for removing heavy hydrocarbon fractions that may foul operation of reactor 320. Referring now to FIG. 3B, the reactor 320 comprises a furnace tube 321 for moving the HSD dispersion 318 through multiple zones, portions, or sections of the reactor 320. HSD dispersion 318 enters reactor 320 at a convection section 340, and is routed to a separator 360 by feed 343. In instances, the separator 360 comprises a flash drum. Without limitation by theory, a flash drum may be an evaporator, a flash reactor, or any other vapor-liquid separator known to a skilled artisan. In instances, the separator 360 is configured to operate at a temperature of about 200° C. to about 600° C., and in certain instances, operate at a temperature of about 450° C. Additional steam 363 may be introduced into separator 360 for enhancing the steam concentration therein, initiating cracking reactions, or improving the steam to naphtha ratio in the dispersion. The separator 360 is configurable to separate heavy molecular weight hydrocarbons, or heavy fractions, from light molecular weight hydrocarbon, or light fractions. The separator 360 forms a return stream 372 to the reactor 320, comprising the light hydrocarbon fractions. In certain configurations, return stream 372 is routed additionally through a heat exchanger (not shown) to produce steam or supplemental steam. The heat exchanger may comprise any apparatus understood by a skilled artisan as suitable for transferring thermal energy from one a fluid to another. In certain instances, the heat exchanger is a counter flow heat exchanger or a cross-flow heat exchanger. In instances, the return stream 372 may be returned to the convection section 340 for heating or directly to the radiant section 344 for cracking. Radiant section 344 of reactor 320 increases the temperature to a temperature between about 600° C. to about 1100° C. Without limitation by theory, the radiant section 344 comprises the cracking reactions in reactor 320 to form MHCP stream 322. In instances, residence time, temperature and pressure in the reactor 320 are dependent on the HSD dispersion 318, the components of the gas stream 310, the components of the naphtha stream 302, and the desired composition of the MHCP stream 322.

Alternatively, the separator 360 produces a crude light fraction stream 361 that is fed to condenser 370. Condenser 370 functions as a stream scrubber and removes any remaining heavy fraction hydrocarbons from the return stream 372. The heavy hydrocarbon fraction is returned to separator as return stream 362. In further instances, the separator 360 forms heavy fraction stream 364 for routing to other downstream processes.

In certain instances, steam 363 may be in fluid communication with separator 360. The separator produces a light fraction stream 361 that is fed to condenser 370. Condenser 370 functions as a stream scrubber and removes any remaining heavy fraction hydrocarbons from the reactor return stream 372 as a return stream 362. In further instances, the separator 360 forms heavy fraction stream 364 for routing to additional processes, or in certain instances as a burn stream.

Referring again to FIG. 2, in some embodiments of the process, the transport resistance is reduced and uniformity of the reactants in HSD dispersion 318 is increased by operation of HSD 315 such that steam use can be reduced by about >5% without increased furnace coking, and the percentage of desirable olefins exiting the reactor/furnace is increased by about >5%. In instances, MHCP stream 322 comprises hydrocarbons with greater olefin content than without the use of HSD 315. Further, in instances, the MHCP stream 322 comprises olefin content greater than about 40%. In certain instances, the MHCP stream 322 comprises olefin content greater than 45%. MHCP stream 322 comprising a distribution of lighter hydrocarbons is directed to a quench 324 to stop the reactions and prevent the reverse reactions or further reactions. In instances, quench 324 reduces the temperature of MHCP stream 322 from between about 800° C. to 900° C. to between about 200° C. and about 400° C., and in certain configurations to about 300° C. For preventing the formation of carbon, coke, and other undesirable hydrocarbon compounds, extremely rapid cooling or quenching, typically in 1 to 100 milliseconds, is advantageous. Further, the quench 324 in HSS 300 may be achieved by spraying water, oil, solvent or other compatible liquid into a reactor quench chamber. Alternatively, the quench 324 comprises a conduit through or into water; or expanded in a kinetic energy quench such as a Joule Thompson expander, choke nozzle or turbo expander. Quench 324 in certain instances comprises introducing a fluid, such as a heavy hydrocarbon, an inorganic liquid, acetylene solvent, water or steam, or another fluid to MHCP stream 322. Quench 324 comprises the liquid introduction in sufficient quantity to abate ongoing reactions in MHCP stream 322. Further, quench 324 is introduced to MHCP stream 322 as a means to maximize olefin concentration by ceasing further reactions, and conversions, within MHCP stream 322. Quenching MHCP stream 322 forms a quenched stream 326. Quenched stream 326 is routed to further processing 350 for downstream products and applications.

Multiple High Shear Mixing Devices:

In certain instances, two or more high shear devices are used to further enhance the reaction in HSS 300. Their operation may be in either batch or continuous mode. In instances, the HSS 300 comprises configuration and process flow changes to derive benefit for the implementation of multiple high shear device arrangements. In instances, the high shear devices may be used as a pretreatment device to prepare the naphtha feedstock prior to cracking as described in US Pat. App. No. US 2009/0000989, Hassan et al.

The application of enhanced mixing, free radical generation and mechanical shearing of the hydrocarbon components in naphtha by a high shear device potentially permits more effective hydrocracking of naphtha streams with better selectivity of end product components and reduced fouling of system components. In some embodiments, the enhanced mixing potentiates a reduction in steam, an associated energy consumption to achieve cracking of naphtha. In some embodiments, the high shear mixing device is incorporated into an established process, thereby enabling an increase in production (i.e., greater throughput). In contrast to some methods that attempt to increase the degree of hydrocracking by simply increasing the reactor operating temperature, or residence time, the superior dispersion free radical generation and contact provided by external high shear mixing may allow, in many cases, a decrease in overall operating temperature, residence time, and/or efficiency, while maintaining, or even increasing, throughput.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims that follow, that scope including all equivalents of the subject matter of the claims.

We claim:

1. A method for processing naphtha, the method comprising:
   introducing a high shear feed stream comprising naphtha and a dispersible phase to a high shear device, wherein the high shear device is configured to produce a shear rate of at least 20,000 s$^{-1}$, thus forming a dispersion of the dispersible phase in the naphtha stream, wherein the dispersible phase comprises steam, and wherein the dispersion comprises steam dispersed therein, and a carrier liquid.

2. The method of claim 1, wherein the dispersion comprises gas bubbles with a mean diameter of less than 50 μm.

3. The method of claim 2, wherein the gas bubbles have a mean diameter of less than about 5 μm.

4. The method of claim 1, wherein introducing the high shear feed stream comprises pumping the high shear feed stream into the high shear device at an elevated pressure.

5. A method for processing naphtha, the method comprising:
   introducing a high shear feed stream comprising naphtha and a dispersible phase to a high shear device, wherein the high shear device is configured to produce a shear rate of at least 20,000 s$^{-1}$, thus forming a dispersion of the dispersible phase in the naphtha stream; and
   cracking at least a portion of the components of the dispersion in a steam cracking furnace, thus producing a cracked product.

6. The method of claim 5, wherein the steam cracking furnace comprises convection and radiant zones.

7. The method of claim 6 further comprising separating a separator feed extracted from the convection zone into a heavy hydrocarbon fraction and a light hydrocarbon fraction, and introducing the light hydrocarbon fraction back into the steam cracking furnace.

8. The method of claim 7, wherein the dispersible phase comprises steam, and wherein the steam cracking furnace further comprises a thermal exchange section configured to route at least a portion of the dispersion outside the steam cracking furnace, whereby the method further comprises producing steam via thermal exchange with the thermal exchange section.

9. The method of claim 5, wherein the cracking furnace is operated at a temperature in the range of from about 200° C. to about 1100° C., and a pressure in the range of from about 1 atm to about 2 atm.

10. The method of claim 5 further comprising quenching the cracked product.

11. The method of claim 10, wherein quenching is performed in from 1 ms to 100 ms.

12. The method of claim 10, wherein quenching reduces the temperature of the cracked product from a temperature in the range of from about 600° C. to about 1100° C., to a temperature in the range of from about 200° C. to about 400° C.

13. A method for processing naphtha, the method comprising:
   introducing a high shear feed stream comprising naphtha and a dispersible phase to a high shear device, wherein the high shear device is configured to produce a shear rate of at least 20,000 s$^{-1}$, thus forming a dispersion of the dispersible phase in the naphtha stream, wherein the high shear device is operated to produce a dispersion comprising primarily micron or submicron-sized steam particles dispersed in naphtha.

14. The method of claim 1 further comprising a second high shear device configured to homogenize the naphtha prior to combination thereof with the dispersible phase.

15. The method of claim 1, wherein the high shear device is operated at a tip speed of greater than 23 m/s.

\* \* \* \* \*